UNITED STATES PATENT OFFICE.

JAMES R. BROWN, OF HAWTHORN, ILLINOIS.

EYE-SALVE.

SPECIFICATION forming part of Letters Patent No. 392,904, dated November 13, 1888.

Application filed April 23, 1888. Serial No. 271,635. (No specimens.)

*To all whom it may concern:*

Be it known that I, JAMES R. BROWN, a citizen of the United States, residing at Hawthorn, in the county of White and State of Illinois, have invented certain new and useful Improvements in Eye-Salves; and I do hereby declare the following to be a full, clear, and exact description of the invention, such as will enable others skilled in the art to which it appertains to make and use the same.

This invention relates to medicinal remedies.

The object is to produce an efficient remedy for the cure of conjunctivitis, granulated eyelids, scrofulous sore eyes, ophthalmia, and, in fact, any inflammation of or about the eyes in the nature of what is ordinarily called "sore eyes" or manifesting itself in redness about the eyes or scum about or upon them.

The invention consists in a burning eye salve or ointment.

To prepare the salve, proceed as follows: Take of oil of cloves, of oil of peppermint, of oil of pennyroyal, of oil of sassafras, of each, one part; of oil of lobelia, one-half part; of pure tallow, twelve parts. Melt the tallow and stir in and thoroughly incorporate the other ingredients, and the product is ready for use.

To use the salve or ointment, apply to the eyelid a portion of about the size of half a grain of wheat. A portion of the size of a grain of wheat is generally sufficient for both eyes. The ointment may be gently rubbed upon the edges or inner edges of the lids.

The application will cause smarting or a burning sensation for a minute or two; but thereafter great relief will be experienced.

Instead of designating the proportions of the ingredients by parts, preparation of the ointment and of a good quantity of the same may be indicated as follows: Take of oil of cloves (*Olei caryophylli*) one ounce; of oil of peppermint, (*Olei menthæ piperitæ*,) one ounce; of oil of pennyroyal, (*Olei hedeomæ*,) one ounce; of oil of sassafras, (*Olei sassafras*,) one ounce; of oil of lobelia, (*Olei lobeliæ*,) half an ounce; of tallow, (*Sebi puri*,) one pound. Melt the tallow and add the other ingredients, stirring the mass to mix the whole together thoroughly.

Directions: Apply a portion of the mass of about the size of a wheat-kernel to the inner edges of the eyelids, with gentle rubbing.

It will be obvious that the proportions given may be somewhat varied without departing from the spirit of my invention.

The ointment or salve above described is a most efficient remedy for all inflammations or irritation of the eyes, being of especial efficacy in cases of granulated eyelids, conjunctivitis, scrofulous sore eyes, and ophthalmia.

Having thus described my invention, what I claim as new, and desire to secure by Letters Patent, is—

An eye salve or ointment consisting of oil of cloves, oil of peppermint, oil of pennyroyal, oil of sassafras, oil of lobelia, and tallow, substantially in the proportions described.

In testimony whereof I affix my signature in presence of two witnesses.

JAMES R. BROWN.

Witnesses:
JNO. T. WARDWORTHY,
WILLIAM P. TULEY.